[United States Patent Office — 3,240,838 — Patented Mar. 15, 1966]

3,240,838
ISOMERIZATION CATALYST FOR CONVERSION OF TYPE III OLEFINS TO TYPE IV OLEFINS
Herschel T. White, Montclair, and Arthur W. Langer, Jr., Watchung, N.J., assignors to Esso Research and Engineering Company, a corporation of Delaware
No Drawing. Filed Dec. 1, 1964, Ser. No. 415,192
5 Claims. (Cl. 260—683.2)

This application is a continuation-in-part of Serial No. 861,740, filed December 24, 1959, now abandoned.

The present invention relates to an improved process for obtaining olefin isomerization of the type wherein a shift in the position of the double bond from a more external position in the molecule to a more internal position is obtained. More particularly, this invention relates to obtaining a highly selective isomerization of Type III olefins to Type IV olefins in the presence of an alkoxy aluminum catalyst under mild conditions such that no skeletal isomerization is obtained. Most particularly, this invention relates to contacting a mixture of different olefins (Type I–V) with an alkoxy aluminum catalyst under conditions to obtain an isomerization of substantially only the Type III olefins. Thus, the conversion of said Type III olefins selectively to Type IV olefins is obtained.

As is well known in petroleum refining technology, monoolefins may be grouped as follows as to the position of the double bond. Thus the five types of olefins are:

| Type: | Formula |
|---|---|
| I | $R-CH=CH_2$ |
| II | $R-CH=CH-R$ |
| III | $R_2C=CH_2$ |
| IV | $R_2C=CH-R$ |
| V | $R_2C=CR_2$ |

In these formulas, of course, R refers to hydrogen, alkyl, cyclo alkyl or aryl groups.

Catalysts suitable for use in the present invention process are aluminum alkoxides characterized as not containing any metal-carbon bonds and which may be represented by the following formulas: $(RO)AlX_2$, $(RO)AlX_2$ and $(RO)_3Al$ wherein each R is the same or a different $C_1$ to $C_{10}$ alkyl group, and wherein X is a halogen atom. Although bromides, fluorides or iodides can be used, it is preferred to use the chlorides. Also, it is most preferred to utilize compounds wherein each R group has 2 to 6 carbon atoms. Of the catalysts described above the most preferred types are $(RO)_2AlX$ and $(RO)AlX_2$. It is preferred to utilize liquid or soluble catalysts rather than solid catalysts although it is contemplated that solid catalysts may be used. Catalysts which are insoluble in the reaction mixture may be used as heterogeneous catalysts either in a finely divided form or on any common support such as charcoal, silica, alumina, magnesia, silica alumina, etc. Likewise catalysts obtained by merely fusing the aluminum alkoxide material may be used.

The above-defined aluminum alkoxide catalysts may be prepared by the quantitative reaction of alkyl aluminum compositions with alcohols to form the desired aluminum alkoxide compositions. This reaction may be illustrated as follows.

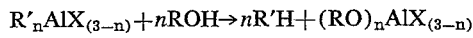

wherein R and X are as defined above and R is the same or a different $C_1$ to $C_{10}$ alkyl group and $n$ is from 1 to 3. The reaction of alkyl aluminum compositions with alcohols has ben used as an analytical method to determine the number of alkyl groups attached to aluminum. In this regard, also see, for example Schultz, "Metal-Organic Compounds," p. 164, Amer. Chem. Soc., Washington, D.C. (1959); Gilman, "Organic Chemistry," vol. I, 2d ed., p. 499, Wiley, N.Y. (1943); W. R. Kroll, Thesis Univ. of Aachen, Germany (1958). Accordingly the formation of the aluminum alkoxide catalysts employed herein does not constitute a part of the inventive concept to which the present application is directed.

In a preferred embodiment of the invention, the aluminum alkoxide catalysts are formed in situ, prior to the isomerization reaction. Thus the alkyl aluminum halide employed, i.e., as defined above, is reacted in situ with the alcohol, i.e., a primary, secondary, or tertiary alcohol having from 1 to 10 carbon atoms, e.g., methanol, isopropyl alcohol, tertiary butyl and the like. Such reactants are refluxed at the boiling point of the alcohol, for example in the range of about 65° C. to 225° C., depending on the alcohol employed.

Feed stocks which may be processed according to the present invention are, of course, pure olefins, mixtures of olefins, or mixtures of olefins with other materials such as paraffins, aromatics, or naphthenes. Where non-olefinic materials are present they of course would not be reacted under the mild conditions of the present invention. Thus, this invention may be used for a variety of purposes such as for separation of close boiling materials, i.e., by changing the Type III olefins present to Type IV olefins. Olefins which may be isomerized according to the present invention are generally $C_4$ to $C_{40}$, preferably $C_5$ to $C_{16}$ olefins, and of course these olefins may contain various amounts of branching.

Accordingly the olefinic feed which may be suitably isomerized can be defined as comprising a $C_4$–$C_{40}$ alpha olefin corresponding to the formula

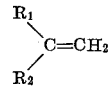

wherein $R_1$ is an alkyl radical of at least 2 carbon atoms and $R_2$ is selected from the group consisting of hydrogen and alkyl. Non-limiting examples of suitable feeds include 1-butene, 1-pentene, 2-methyl pentene-1; 2-ethyl octene-1; 1-decene, 2-methyl dodecene-1, and the like, as well as mixtures of any or all of the foregoing. Although it is preferred to obtain selective isomerization of Type III to Type IV olefins, isomerization of Type I to Type II olefins may also be obtained, however, usually at more severe conditions.

Reaction conditions which are utilized to accomplish the present isomerization are temperatures of 100 to 300° C., and reaction times of 1 to 120 minutes. Any pressures may be used from 0.1 to 10 atmospheres, although it is preferred that the reaction be carried out in the liquid phase. The catalysts are generally soluble in the olefin or olefin detergent mixture and therefore operate as homogeneous catalysts. In some cases it may be desirable, where the olefin is sufficiently volatile, to utilize vapor phase isomerization in the presence of a heterogeneous catalyst such as a supported "soluble" catalyst.

By controlling temperatures within the range of 100 to 225° C., more preferably 175 to 215° C. and reaction times within the range of 5 to 60 minutes, preferably 5 to 30 minutes, a particularly selective conversion can be obtained. Thus, only Type III olefins in a mixture of other olefins are isomerized and these Type III olefins are converted selectively to Type IV olefins. It should be noted that at these reaction conditions there is also no skeletal isomerization.

It is noteworthy that under severe conditions such as temperatures of 225 to 300° C., and/or reaction times of 1 to 120 minutes, isomerization of Type I to Type II olefins may be obtained (in addition to isomerization of Type III to Type IV olefins if these types are present in the reaction mixture). In all of the above reactions amounts of catalysts which are required are generally in the range of 0.001 to 0.02, preferably 0.005 to 0.01, weight of catalyst per weight of feed in the reaction zone. The present catalyst is quite stable and does not suffer any appreciable degradation in the reaction. Therefore, it may be separated by distillation or other methods as desired and recycled to the reaction zone. Since only small amounts are used, of course, it may alternatively be merely washed from the reaction mixture and discarded or otherwise removed by absorption or precipitation.

The catalysts of this invention are preferably used in combination with an activator which is capable of donating protons, for example halogen acids, alcohols or water. The most preferred of the halogen acids is HCl. As to the alcohols, these may be primary, secondary, or tertiary alcohols having from 1 to 10 carbon atoms, e.g. methanol, isopropyl alcohol, tertiary butyl alcohol. These materials are utilized in an amount of 0.01 to 100 moles/mole of catalyst and their purpose is to facilitate protonation⇌deprotonation of the olefin molecule which is required for double bond isomerization.

The present invention will be more clearly understood from a consideration of the following examples which illustrate laboratory methods for carrying out the present process. Additionally, it should be noted from these examples that essentially no skeletal isomerization occurs at these relatively mild reaction conditions.

*Example 1*

90 ml. of a $C_{12}/C_{14}$ fraction from a highly branched polyethylene oil prepared by polymerizing ethylene with an alkyl aluminum halide/$TiCl_4$ catalyst in chlorobenzene diluent, was refluxed with 0.010 mole of $EtAlCl_2$ and 0.65 mole of isopropanol (99%) for 2 hours at the boiling point (84.42° C.) of the alcohol. In order to effect the desired isomerization reaction, the mixture was then stripped for about 30 minutes at a pot temperature of 215° C. and an overhead temperature of about 180° C. The change in olefin-type distribution obtained is indicated below.

|  | Feed | Product |
|---|---|---|
| Type III, vol. percent | 63 | 8 |
| Type IV, vol. percent | 0 | 57 |
| Type I, vol. percent | 21 | 18 |
| Type II, vol. percent | 16 | 17 |

*Example 2*

90 ml. of the same material described in Example 1 was refluxed with 0.008 mole of $Et_2AlCl$ and 0.65 mole of isopropanol (99%) for 2 hours at the boiling point of the alcohol. The desired isomerization reaction was accomplished by stripping the mixture at a pot temperature of 215° C. and an overhead temperature of about 180° C. Olefin-type distribution, calculated from the infrared spectra, was altered as indicated in Example 1.

*Example 3*

The product obtained in Example 1 was subjected to infrared methyl group analysis to determine if any skeletal isomerization had been obtained. The following data were obtained:

|  | Total methyl, groups/molecule [1] | Side chain methyl, groups/molecule [1] |
|---|---|---|
| Before isomerization | 4.70 | 3.30 |
| After isomerization | 4.88 (5.16 theo.) | 3.0 |

[1] Side chain $CH_3$ = Total $CH_3$ − Terminal $CH_3$. Terminal $CH_3$ content is calculated on basis of olefin type analysis assuming 100% monoolefin content.

From these data it can be seen that little, if any, such isomerization in fact occurred.

It is to be understood that this invention is not limited to the specific examples, which have been offered merely as illustrations and, that modifications may be made without departing from the scope of this invention.

What is claimed is:

1. The process which comprises isomerizing $C_4$–$C_{40}$ alpha olefins having the general formula:

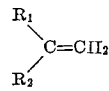

wherein $R_1$ is an alkyl radical of at least 2 carbon atoms and $R_2$ is selected from the group consisting of hydrogen and alkyl at a temperature in the range of from 100 to 300° C. for from 1 to 120 minutes in contact with a catalyst consisting of a member of the group of materials represented by the formulas $(RO)AlX_2$, $(RO)_2AlX$, and $(RO)_3Al$ wherein each R is a $C_1$ to $C_{10}$ alkyl group and X is a halogen atom whereby a selective isomerization of feed olefins is obtained resulting in a shift of the double bond from the terminal carbon atom to an internal position in the molecule with little if any, skeletal isomerization.

2. The process of claim 1 in which the halogen atom of the catalyst is chlorine and the reaction conditions are temperatures of 100 to 225° C. and the reaction times of 5 to 60 minutes.

3. The process of claim 1 in which reaction conditions are temperatures of 100 to 225° C. and reaction times of 5 to 60 minutes and the catalyst is obtained in situ in the reaction zone by the reaction of an alkyl aluminum compound having the formula

wherein R is a $C_1$–$C_{10}$ alkyl, X is a halogen atom and $n$ is an integer of from 1 to 3 with an alcohol having from 1 to 10 carbon atoms.

4. The process of claim 3 in which the alkyl aluminum compound is ethyl aluminum dichloride and the alcohol is isopropanol.

5. The process of claim 3 in which the alkyl aluminum compound is diethyl aluminum chloride and the alcohol is isopropanol.

References Cited by the Examiner

UNITED STATES PATENTS 2,967,206  1/1961  Stuart et al. _____ 260—683.15

FOREIGN PATENTS 1,189,570  3/1959  France.

ALPHONSO D. SULLIVAN, *Primary Examiner.*